No. 866,537. PATENTED SEPT. 17, 1907.
A. H. THIBAULT.
PNEUMATIC SPOKE WHEEL.
APPLICATION FILED OCT. 13, 1905.
3 SHEETS—SHEET 1.
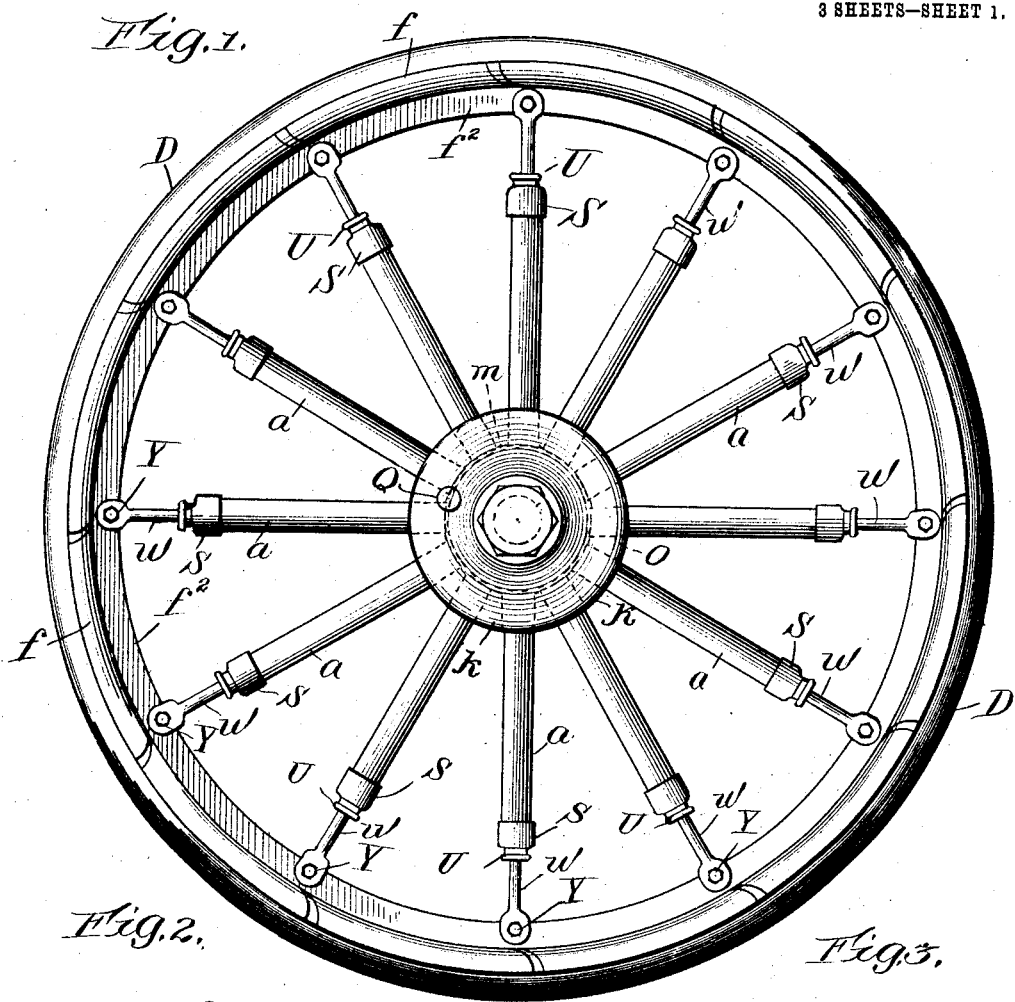
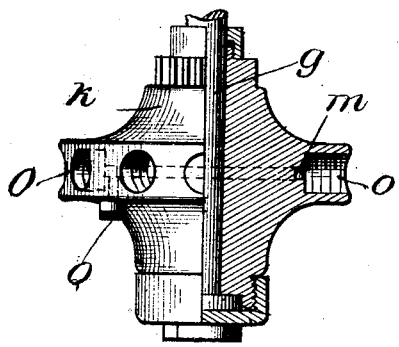
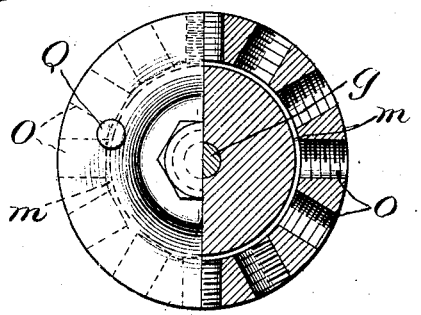
Witnesses:
Otto M. Wemiel
E. K. Lundy
Inventor:
Arthur H. Thibault
by Frank D. Thomason
Atty.

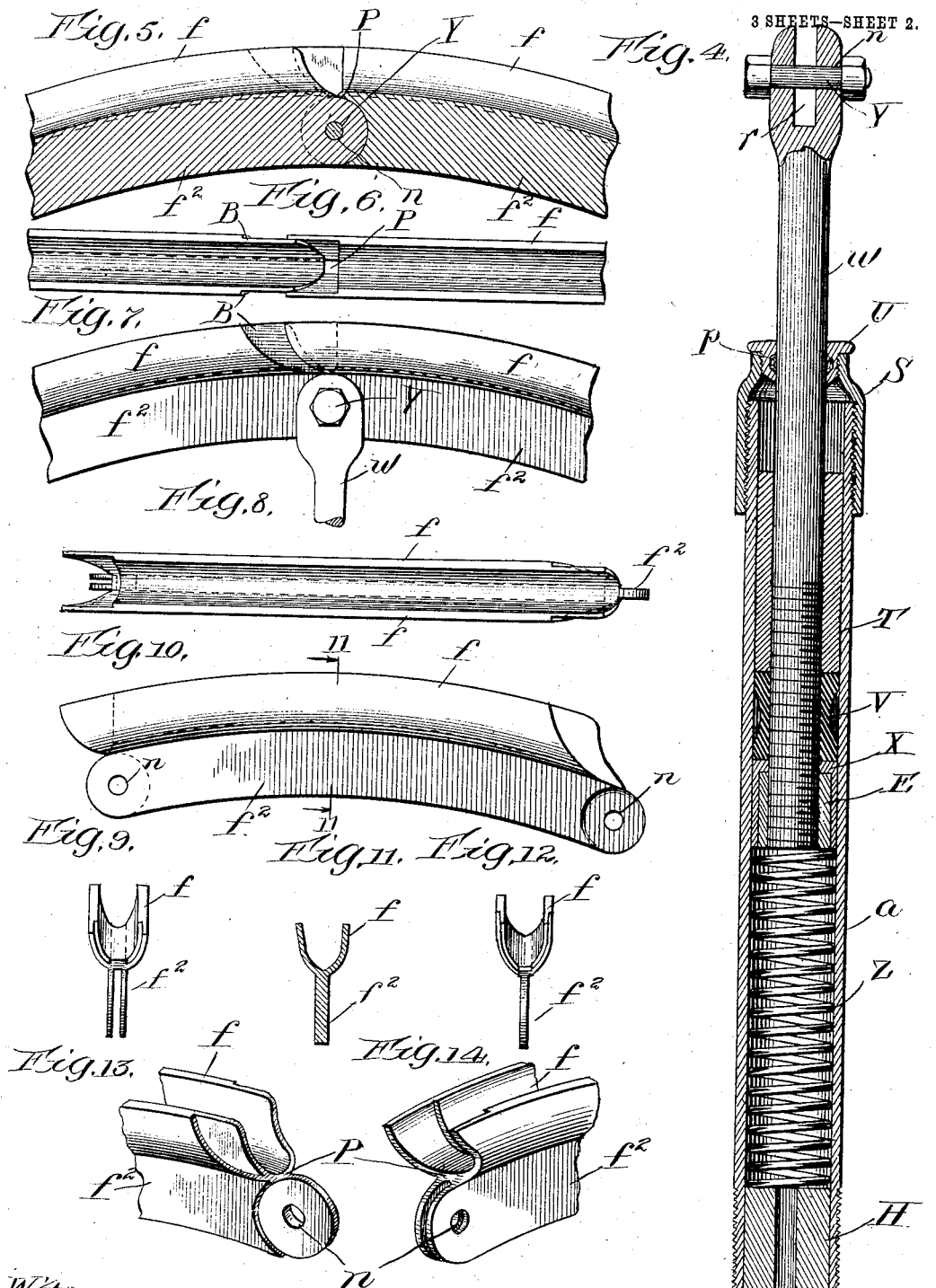

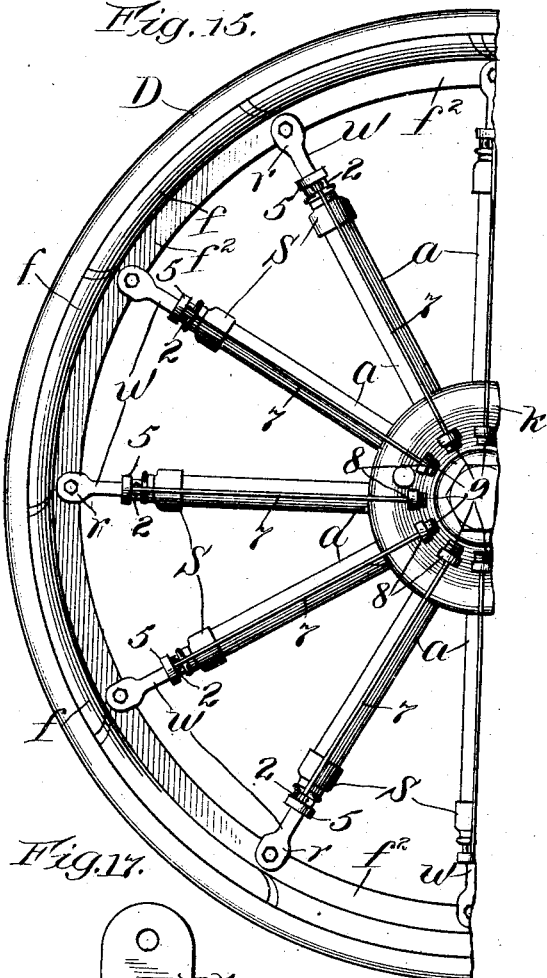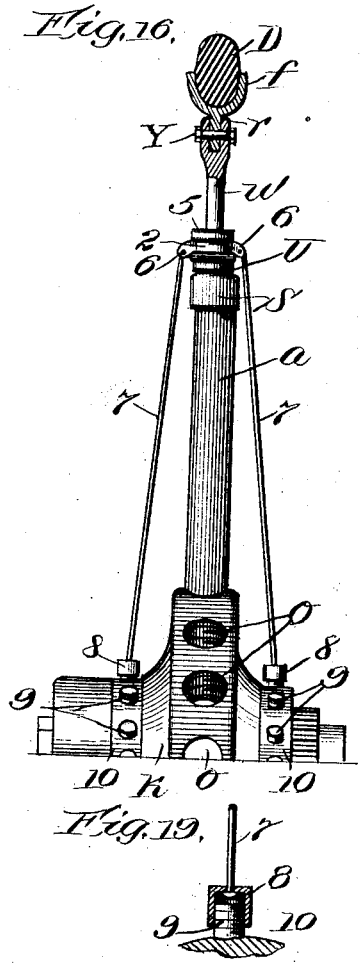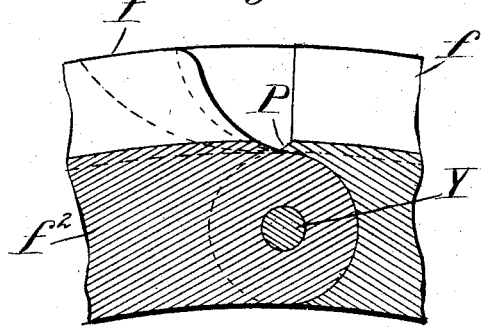

UNITED STATES PATENT OFFICE.

ARTHUER H. THIBAULT, OF VALPARAISO, INDIANA.

PNEUMATIC-SPOKE WHEEL.

No. 866,537.      Specification of Letters Patent.      Patented Sept. 17, 1907.

Application filed October 13, 1905. Serial No. 282,606.

*To all whom it may concern:*

Be it known that I, ARTHUER H. THIBAULT, a citizen of the United States, and a resident of Valparaiso, in the county of Porter and State of Indiana, have invented certain new and useful Improvements in Pneumatic-Spoke Wheels, of which the following is a full, clear, and exact description.

My invention relates to wheels for vehicles, and its principal object is to produce a wheel which is resilient and capable of running over obstacles and rough surfaces in the same manner and with the same effect as wheels having pneumatic tires, only the periphery of my improved wheel is capable of yielding to a greater extent, and it is not subject to puncture and the inconvenience and expense resulting therefrom, like pneumatic tires, and is more durable. This I accomplish by cushioned spokes, which pneumatically communicate with each other, and by a sectional rim, the supporting part of which may yield towards the axis of the wheel while the remainder retains its circularity, and by other features substantially as hereinafter fully described and as particularly pointed out in the claims.

In the drawings, Figure 1 is a side view of a wheel embodying my invention. Fig. 2 is a view of the hub of said wheel, half in plan and half in longitudinal central section. Fig. 3 is a view showing said hub half in side view and half in transverse section. Fig. 4 is a longitudinal central section of one of the spokes drawn to a larger scale. Fig. 5 is a longitudinal section of a segment of the rim of the wheel drawn to the same enlarged scale. Fig. 6 is a plan view thereof. Fig. 7 is a side view of the same. Fig. 8 is a plan view of one of the rim sections. Fig. 9 is a view looking at one end of the same. Fig. 10 is a side view thereof. Fig. 11 is a transverse section of said rim section taken on dotted line 11—11, Fig. 10. Fig. 12 is an end view of the end of the same opposite that shown in Fig. 9. Figs. 13 and 14 are perspective views of the broken away ends of the rim sections of the wheel. Fig. 15 is a side view of one-half of my improved wheel having means applied thereto for resisting the lateral strain. Fig. 16 is a partial cross-section of one half of a similar wheel, and, Figs. 17, 18, and 19 are views showing details thereof.

Referring to the drawings, $k$ represents a hub which can be secured fast to or be placed loosely on the axle $g$ of the wheel, and is, preferably, made of metal, and has about its center of length, a circumferential flange that is provided with a series of equidistant corresponding spoke-openings $o$, in its periphery. The bottoms of these spoke openings $o$ are connected by a circular passage $m$ and are provided with integral screw-threads that are engaged by the male threads of the inner ends of the tubular section or cylinder $a$ of the spokes, which are preferably reinforced by inserting perforate plugs H therein as shown. The outer portions of the spokes consist of pistons $w$, whose outer extremities $r$ are bifurcated and are secured to the sectional rim of the wheel, as will hereinafter be more fully described, and whose inner portions enter the outer ends of and have longitudinal reciprocal play in the spoke cylinders $a$. The extremities of the pistons $w$ within the cylinders are provided with piston-heads consisting of a metal sleeve E screwed thereon and a packing X of leather or other suitable material surrounding and interposed between the same and the walls of the cylinder $a$ of the spoke. Surrounding the piston next the piston-head is an expansible packing V of rubber or other suitable material the outer circumference of which is, preferably, provided with a concave depression surrounding it between its ends, and between this packing V and the outer end of the cylinder the piston $w$ is provided with a compression-sleeve T, which is of such diameter as to have sliding contact with the inner circumference of the cylinder, and is preferably slightly more than twice the length of the packing V. The outer ends of the cylinders $a$ are closed by caps S, which are provided with a gland-nut U, having a packing $p$, through which the pistons $w$ reciprocate.

The rim of the wheel consists of a number of segments $f, f$, each corresponding in length to the distance between the outer ends of the spokes and have their ends pivotally connected by a transverse pin Y. The outer circumference of these segments comprises two corresponding longitudinal flanges which form a continuous concave channel in which the rubber tire D is seated substantially as shown in the drawings. The inner circumferential part of each segment consists of a flat felly $f^2$, the transaxial plane of which is midway between the flanges forming the concave seat for the tire of the wheel. This felly portion of each segment is bifurcated at one end and is reduced in width at the other end, and when the wheel is assembled these fellies are arranged end to end so that the reduced end of each felly will be between the bifurcations of the next felly, and the joint thus made is placed between the bifurcations of the outer ends of the pistons $w$ and the said parts connected by the transverse pin Y, which latter extends through the openings $n$ in the ends of said fellies. The ends of the flanges forming the channel in which the tire is seated corresponding to the bifurcated end of the fellies are extended forward slightly beyond the rounded end edge of said bifurcations and are given an overhanging curve as shown, and the opposite end edges of said flanges are cut away back from the adjacent end of the felly portion and curved the obverse of that given the opposite overhanging end edges. When a joint comes in contact with the roadway traveled by the wheel the fellies move slightly toward the center of the wheel according to the inward movement of the piston. This movement is accommodated by permitting the contacting ends of the flanges of the tire-seat to lap past each other, and I depress the outer surfaces of the flanges adjacent to the cutaway edges thereof, and depress the inner surfaces of the opposite extended ends of said flanges, so that the joint will not be increased in width at this point, and so that said joint will be free to yield inwards but not outwards. In order to prevent interference with this inward movement I also cut away or bevel the end edges of the bottom of the channels in which the tire is seated, as shown at P.

In Figs. 15, 16, 17, 18, and 19, of the drawings, I show means for bracing and counteracting the lateral strain on my improved wheel which I prefer to use, but which may be dispensed with, if desired. These means comprise a bearing socket 2 surrounding the pistons w, which rests upon the outer ends of the gland-nuts U of the cylinders a, in which bearing-balls 3 are placed, and held by the cup 4, which latter is adjustably held in place by the nut 5. The sides of the sockets are provided with lugs 6, 6, projecting therefrom diametrically opposite each other, and stay-spokes 7 having their outer ends secured to said lugs 6, and their inner ends headed on the inside of suitably shaped cups 8, which latter are interiorly threaded to enable them to be adjustably secured to screw-threaded studs 9 projecting radially from a band 10 shrunk upon or removably seated in a stepped portion of the hub k, substantially as shown in the drawings.

In operation, when the weight sustained by my improved wheel is great, or the path traveled thereby is rough and uneven, or beset with obstacles, the portion of the tire and rim coming in contact with the road yields, and the pistons supporting such portion move back longitudinally into their cylinders until the compressed air therein prevents their further movement. As the air is compressed by the inwardly moving pistons the atmospheric compression is imparted to the air-chambers of all of the cylinders a through the medium of the channel m connecting their sockets and thus the effect of the air compression is felt by all the spokes, and by exerting an outward force upon them, keeps the remainder of the wheel circular. In order to fill the air-chambers of the cylinders of the spokes with compressed-air I have provided the flange of the hub in which the spoke-sockets are made with a suitable in-take valve Q, which communicates with the channel m and can be operated by an ordinary bicycle pump. Should the spokes commence leaking and the compressed-air therein escape, I avoid the possibility of the wheel collapsing by placing coiled expansion springs Z in the air-chambers of the cylinders a between the piston-heads and plugs H substantially as shown in the drawings.

It will be understood that the maximum normal circumference of the rim is always maintained within a circle struck from the center of the hub as an axis and having its radius equal to substantially one-half the diameter of said wheel, and under no circumstances during the revolution of the wheel is the rim permitted to extend beyond this maximum circumference.
I do not desire to confine the use of my invention to automobiles and similar vehicles as it can be used for other purposes.

What I claim as new is:—

1. A wheel comprising a sectional rim the outward movement of which is confined within the maximum normal circumference of the wheel, and pneumatically cushioned spokes each consisting of telescopic members and a packing interposed between the head of the inner member and the closed end of the outer member.

2. A wheel comprising a sectional rim the outer circumference of which is provided with a concave channel and the inner circumferential portion of which consists of a single flange, the outward movement of which is confined within the maximum normal circumference of the wheel, and pneumatically cushioned spokes each consisting of telescopic members and a packing interposed between the head of the inner member and the closed end of the outer member.

3. A wheel comprising telescopic pneumatically cushioned spokes, and a sectional rim, each section of which is provided with a concave channel the walls of which at one end overlap those of the next section and at the other end are overlapped in like manner.

4. A wheel comprising telescopic pneumatically connected cushioned spokes, and a sectional rim, each section of which is provided with a concave channel the walls of which at one end overlap those of the next section and at the other end are overlapped in like manner.

5. A wheel comprising a hub, spokes each comprising a tubular portion secured at one end to said hub, a piston telescopically connected to the same and a packing interposed between the head of said piston and the free end of said tubular portion, and a sectional rim secured to the outer ends of said pistons and confined within the maximum circumference of said wheel.

6. A wheel comprising a hub, spokes each consisting of a tubular portion secured at one end to said hub, a piston telescopically connected to the same and a packing interposed between the head of said piston and the free end of said tubular portion, and a sectional rim the joints of which articulate with the outer ends of said pistons and confined within the maximum circumference of said wheel.

7. A wheel comprising a hub, spokes each consisting of a tubular portion secured at one end to said hub which are pneumatically connected, a piston telescopically connected to the same and a packing interposed between the head of said piston and the free end of said tubular portion, and a sectional rim secured to the outer ends of said pistons and confined within the maximum circumference of said wheel.

8. A wheel comprising a hub, spokes each consisting of a tubular portion secured at one end to said hub, and a piston telescopically connected to the same, and a sectional rim the joints of which overlap and articulate with the outer ends of said pistons, the outward movement of said rim being confined within the maximum normal circumference of the wheel.

9. A wheel comprising a hub, spokes each consisting of a tubular portion secured at one end to said hub that are pneumatically connected, a piston telescopically connected to the same, and a sectional rim the joints of which overlap and articulate with the outer ends of said spokes, the outward movement of said rim being confined within the maximum normal circumference of the wheel.

10. A wheel comprising a hub having pneumatically connected spoke openings therein, spokes each consisting of a tubular portion secured at one end in said openings, a piston telescopically connected to the same and a packing interposed between the head of said piston and the free end of said tubular portion, and a sectional rim the joints of which articulate with the outer ends of said pistons and confined within the maximum circumference of said wheel.

11. A wheel comprising a hub having pneumatically connected spoke openings therein, spokes each consisting of a tubular portion secured at one end in said openings, a piston telescopically connected to the same and a packing interposed between the head of said piston and the free end of said tubular portion, and a sectional rim the joints of which articulate with the outer ends of said pistons and confined within the maximum circumference of said wheel 12. A wheel comprising a hub having pneumatically connected spoke openings therein, spokes each consisting of a tubular portion secured at one end in said openings and a piston telescopically connected to the same, and a sectional rim the joints of which overlap and articulate with the outer ends of said pistons the outward movement of said rim being confined within the maximum normal circumference of the wheel.

13. A wheel comprising a hub, spokes each consisting of a tubular portion secured at one end to said hub, a piston telescopically connected to the same and a packing interposed between the head of said piston and the free end of said tubular portion, means connected to said hub through which said pistons move for relieving the lateral strain thereon, and a sectional rim secured to the outer ends of said pistons and confined within the maximum circumference of said wheel.

14. A wheel comprising a hub, spokes each consisting of a tubular portion secured at one end to said hub, and a piston telescopically connected to the same, means connecting said hub and the outer ends of the tubular portions of the spoke through which said pistons move for relieving the lateral strain thereon, and a sectional rim secured to the outer ends of said pistons.

15. A wheel comprising a hub, spokes each consisting of a tubular portion secured at one end to said hub, and a piston telescopically connected to the same, ball-bearing means connected to said hub through which said pistons move for relieving the lateral strain thereon, and a sectional rim secured to the outer ends of said pistons.

16. A wheel comprising a hub, spokes each consisting of a tubular portion secured at one end to said hub, and a piston telescopically connected to the same, ball-bearing means connecting said hub and the outer ends of the tubular portions of the spoke through which said pistons move for relieving the lateral strain thereon, and a sectional rim secured to the outer ends of said pistons.

17. A vehicle-wheel comprising a hub, a surrounding rim comprising a plurality of jointed sections and formed to provide a seat for a tire, said rim maintained circular within the maximum normal circumference of the wheel, and spokes extending from the hub to the rim, each spoke comprising a section connected with the hub and a section connected with the rim, one of which is tubular and receives the other, and a packing in said tubular section interposed between the free end thereof and the head of the other member through which the latter reciprocates, and means whereby a body of air under pressure may be introduced in said tubular section.

18. A vehicle-wheel comprising a hub, a surrounding flexible rim having circumferentially-separated, defined joints of flexure the outward movement of which is maintained within the maximum normal circumference of the wheel, and spokes extending from the hub to the rim, each of said spokes being made of two sections, one attached to the hub and the other to the rim, at least one of said spoke-sections being made tubular to receive the other, and a packing in said tubular section interposed between the free end thereof and the head of the other member through which the latter reciprocates, means for admitting air under pressure to said tubular sections, and stuffing-boxes for preventing the escape of air from said tubular spoke-sections.

19. A vehicle-wheel comprising a hollow-hub, a surrounding flexible rim having circumferentially separated defined points of flexure the periphery of said rim being maintained within the maximum normal circumference of the wheel and formed to provide an annular tire-seat and spokes extending from the rim to the hub, each spoke being made of two sections, one attached to the rim and the other to the hub and communicating with the interior thereof, the inner spoke-sections being made tubular and receiving the outer spoke-sections, and a packing in said tubular section interposed between the free end thereof and the head of the other member through which the latter reciprocates, and means for admitting air under pressure to the hollow hub.

20. A vehicle-wheel comprising a hub, a surrounding rim comprising a plurality of short curved sections hinged together at their adjacent ends to constitute a circular rim, the periphery of which is confined within the maximum normal circumference of the wheel, and spokes connected each at its outer end with one section of the rim and at its inner end with the hub, each of said spokes comprising two telescopic sections, at least one of which is tubular, and a packing in said tubular section interposed between the free end thereof and the head of the other members through which the latter reciprocates, and means for admitting air under pressure to said tubular spoke-sections.

In testimony whereof I have hereunto set my hand this 26th day of September, A. D., 1905.

ARTHUER H. THIBAULT.

Witnesses:
AMOS A. STONE BURNER,
FRANK D. THOMASON.